INVENTOR
C. K. N. PATEL
BY
Wilford L. Wisner
ATTORNEY

United States Patent Office 3,414,728
Patented Dec. 3, 1968

3,414,728
INFRARED MODULATORS AND DETECTORS EMPLOYING SINGLE CRYSTAL Te OR Se
Chandra K. N. Patel, Chatham, N.J., assignor to Bell Telephone Laboratories, Incorporated, New York, N.Y., a corporation of New York
Filed Dec. 23, 1965, Ser. No. 515,973
6 Claims. (Cl. 250—199)

ABSTRACT OF THE DISCLOSURE

In the infrared modulating and detecting apparatus disclosed, the infrared radiation is transmitted through an active element that is a single crystal consisting essentially of elemental material selected from the group consisting of elemental tellurium, elemental selenium and a mixture of elemental tellurium and elemental selenium. An electro-optic modulator, a Faraday modulator and a traveling-wave-type detector are disclosed.

---

This invention relates to optical apparatus for translating information, including optical modulators and optical detectors, at infrared carrier wavelengths.

Much effort has been devoted in recent years to the devising and analysis of optical communication systems, particularly those employing lasers as coherent radiation sources.

One type of such a communication system would employ transmission through the atmosphere. Since the atmosphere is more transmissive for some wavelength ranges, i.e., "atmospheric windows," than for others, it is desirable to employ as carrier radiations those for which the atmosphere is most transmissive. The wavelength range from $8\mu$ to $14\mu$ is one such "atmospheric window."

To meet this need, the carbon dioxide laser operating at $10.6\mu$ has been devised and improved in numerous respects. For example, as disclosed in my copending application, Ser. No. 495,844, filed Oct. 14, 1965 and assigned to the assignee hereof, I have discovered that the addition of large amounts of helium to the nitrogen-carbon dioxide mixture of such a laser enables continuous-wave stimulated emission of coherent radiation at the highest continuous power levels thus far reported in the laser art.

In order to employ this powerful laser for communication purposes, it is desirable to modulate and demodulate the radiation efficiently.

In my concurrently filed patent application (case 10), Ser. No. 515,981, filed Dec. 23, 1965, assigned to the assignee hereof, I describe my discovery of surprisingly strong nonlinear effects in single crystal tellurium when pumped by the carbon dioxide laser. Therein is disclosed particularly parametric devices that typically employ propagation of the radiation through a substantial amount of tellurium or selenium which is substantially intrinsic, i.e., substantially free of impurities or defects which contribute free charge carriers.

The instant invention is based on the realization that at infrared wavelengths tellurium and selenium have properties that adapt them advantageously for use in other than parametric devices. In particular, extrinsic tellurium and selenium appear to exhibit special advantages for use in Faraday modulation and square-law demodulation while substantially intrinsic tellurium and selenium appear to exhibit favorable properties for use in electro-optic type modulation.

The crystals employed are single crystals consisting essentially of elemental material selected from the group consisting of elemental tellurium, elemental selenium and a mixture of elemental tellurium and elemental selenium. The crystals consist essentially of the stated elements in the sense that one or more of these elements form the lattice of the crystal. The extrinsic crystals are extrinsic in that the inclusion of doping impurities or lattice vacancies, not changing the basic lattice, is contemplated.

Further features and advantages of my present invention will become apparent from the following detailed description, in conjunction with the drawing, in which.

Figure 1:
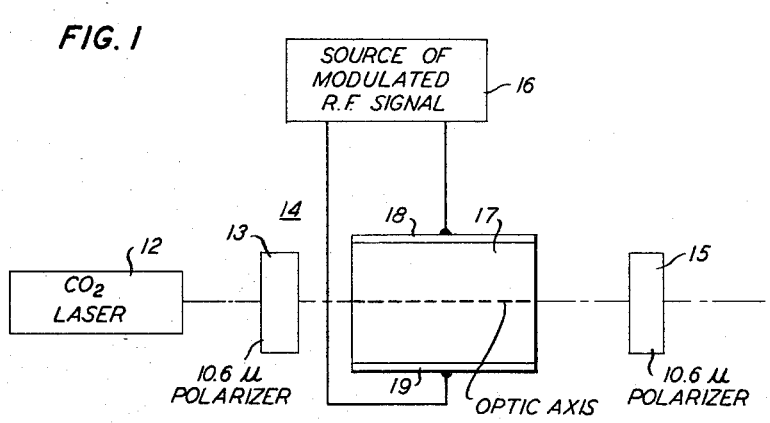
FIG. 1 is a partially pictorial and partially block diagrammatic showing of an embodiment of an electro-optic modulator according to one aspect of the present invention.

In FIG. 1, there are coupled in tandem the $CO_2$ laser 12, the $10.6\mu$ polarizer 13, the tellurium or selenium modulator 14, and the $10.6\mu$ polarizer 15, in that order. The polarization axis of the polarizer 15 is crossed to that of polarizer 13, and the modulator 14 is coupled to a source 16 of a modulated radio-frequency signal, which is the modulation to be imposed upon the $10.6\mu$ radiation.

The $CO_2$ laser 12 is illustratively of the type disclosed in my above-cited copending patent application.

The $10.6\mu$ polarizers 13 and 15 are illustratively single crystals of tellurium having major faces cut to be parallel to their optic axes and having hole (positive charge carriers) concentrations greater than $1 \times 10^{18}$ holes per cubic centimeter. The major faces are oriented to be orthogonal to the direction of propagation of the $10.6\mu$ radiation.

The modulator 14 illustratively comprises a single crystal 17 of tellurium having its optic axis substantially parallel to the direction of propagation of radiation and the electrodes 18 and 19, which lie in planes substantially parallel to the optic axis. Crystal 17 is oriented so that the direction of the optic axis, which is induced by the modulating electric field set up by electrodes 18 and 19, is at an angle of 45°, with respect to the directions of the polarization axes of polarizers 13 and 15. The induced optic axis lies along a principal crystalline ($x$ or $y$) axis. The tellurium crystal 17, by techniques known in the art, is prepared to be as intrinsic as feasible and particularly to have a hole (positive free charge) concentration less than $1 \times 10^{17}$ per cubic centimeter at the temperature of operation. This serves to minimize unwanted resonance absorption. The hole concentration is typically the result either of copper traces or lattice defects. As is known, the effective hole concentration can be reduced by lowering the temperature. The crystal 17 illustratively has a length of about 1 centimeter. Its diameter orthogonal to the direction of propagation is illustratively about 1 centimeter. The electrodes 18 and 19 are illustratively vacuum-deposited gold.

The source 16 may illustratively include a microphone through which a voice signal is supplied, a conventional source of radio-frequency energy and a conventional radio-frequency modulator adapted to amplitude-modulate the radio-frequency energy with the voice signal.

In operation, laser 12 produces a beam of coherent radiation at $10.6\mu$, polarizer 13 polarizes this radiation to the extent not already so polarized by laser 12 to have its electric field intensity vector parallel to a so-called $y$ crystalline axis of crystal 17, and modulator 14 varies the relative propagation velocity of 45° polarization components of the radiation to produce, in general, an elliptical polarization of varying ellipticity at the exit face of crystal 17. The crossed polarizer 15 then passes a varying-amplitude portion of this radiation.

More particularly, in crystal 17, the modulating electric field is applied along a so-called $x$ crystalline axis and induces an optic axis orthogonal to the direction of propagation of the $10.6\mu$ radiation and at 45° with respect to the $x$ and $y$ axes. The component of radiation having a polarization parallel to this induced optic axis propagates at a velocity different from that of the component of radiation having a polarization orthogonal thereto. The difference in propagation velocities is directly related to the strength of the modulating electric field. The modulation can also be considered from the viewpoint of the relative phase shift of the waves constituting the two components. This relative phase shift is usually called a relative phase retardation. When the relative phase retardation becomes 180°, the resultant polarization of the radiation passing through crystal 17 is rotated by 90° and is readily passed by the polarizer 15. For a signal of lesser amplitude, a smaller portion of the radiation is passed by polarizer 15. Thus, an amplitude-modulated signal is obtained at the output of polarizer 15, and this signal is responsive to the modulation carried by the signal from source 16.

It is interesting to note that, although the electrodes 18 and 19 are laterally disposed, the crystal structure of tellurium is such that the linear (Pockels) electro-optic effect is employed.

A modulation index of 100 percent (180° relative phase retardation) may be obtained with a voltage of about 100 volts applied between electrodes 18 and 19 for a tellurium crystal, whereas the same index requires 7000 volts applied to a crystal of KDP (potassium dihydrogen phosphate) or about 5000 volts applied to a crystal of $LiNbO_3$ (lithium meta-niobate) one centimeter long and three millimeters thick in the electric field direction, assuming the use of a carrier radiation having an optimum wavelength for that device.

If tellurium crystal 17 is replaced by a single crystal of selenium of comparable size and purity and with similarly positioned electrodes, a modulation index of 100 percent (180° relative phase retardation) of $10.6\mu$ radiation may be obtained with a voltage of about 800 volts applied between the electrodes.

Moreover, as compared to prior modulators, modulators employing tellurium and selenium according to the present invention have the distinct advantage of being relatively transparent to a carrier radiation having a wavelength in the range of the atmospheric window from $8\mu$ to $14\mu$. Selenium is transparent also in the shorter wavelength windows, e.g., the $3.5\mu$ window.

A mixed single crystal of tellurium and selenium may be grown by techniques known in the art and will in general have properties intermediate those (i.e., bandgap and second order polarization coefficent) of the elements. Optimum characteristics for operation in the $3.5\mu$ window may be provided by such a mixed crystal.

Nearly all of the modulating effects known to be employable in bulk optical crystals may be employed to produce modulation of infrared radiation in tellurium or selenium. A summary of such effects may be found in chapter 29 of Jenkins and White, Fundamental of Optics, third edition, McGraw-Hill (1957) and include the Zeeman and inverse Zeeman effects, the Voight, Cotton-Mouton, Faraday and Kerr magneto-optic effects, the Stark and inverse Stark effects, electro-optic double refraction, Pockels electro-optic effect and Kerr electro-optic effect.

Figure 2:
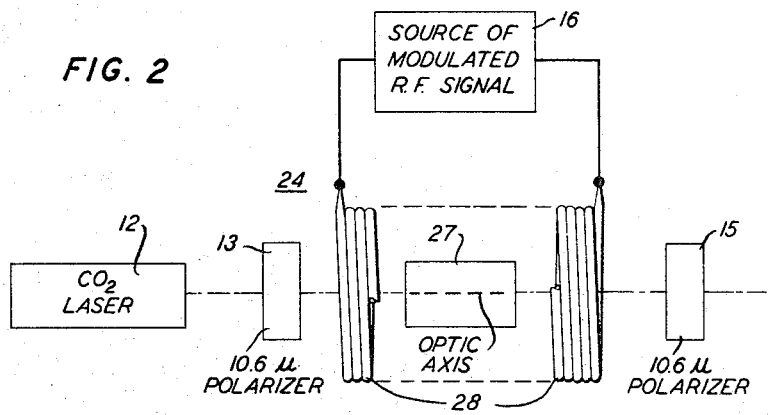
FIG. 2 is a partially pictorial and partially block diagrammatic showing of an embodiment of a Faraday modulator according to another aspect of the present invention.

An embodiment of the invention employing the Faraday effect is shown in FIG. 2. There are coupled in tandem the $CO_2$ laser 12, the $10.6\mu$ polarizer 13, the tellurium modulator 24, and $10.6\mu$ polarizer 15, in that order. The polarization axis of polarizer 15 is crossed to that of polarizer 13; and the modulator 24 is coupled to a source 16 of a modulated radio-frequency signal, which is the modulation to be imposed upon the $10.6\mu$ radiation.

The devices 12, 13, 15 and 16 are the same as disclosed above for the embodiment of FIG. 1.

The modulator 24 illustratively comprises a single crystal 27 of tellurium having its optic axis substantially parallel to the direction of propagation of the radiation supplied by laser 12. And the coil 28, which produces the modulating magnetic field, has an axis substantially parallel to the optic axis of crystal 27. The orientation of the crystalline axes of crystal 27, with the exception of the optic axis, are not critical.

For this application, the tellurium crystal 27, by techniques known in the semiconductor art, is treated either by doping with copper or by introducing lattice vacancies to have at the temperature of operation a hole concentration in the range between $1 \times 10^{18}$ per cubic centimeter and $1 \times 10^{19}$ holes per cubic centimeter, and preferably about $1.5 \times 10^{18}$ holes per cubic centimeter. For the latter concentration, the crystal 27 illustratively has a length of about one centimeter. Its diameter orthogonal to the direction of propagation is illustratively about 1 centimeter.

The coil 28 is illustratively an induction coil wound to form a continuous cylinder extending enough beyond each end of crystal 27 in order to provide a uniform field therein.

In operation, laser 12 produces a beam of coherent radiation at $10.6\mu$, polarizer 13 polarizes this radiation to the extent not already so polarized by laser 12, and modulator 24 rotates the direction of polarization of the $10.6\mu$ radiation by an amount directly related to the strength of the applied magnetic field as a consequence of the Faraday effect while maintaining the polarization linear. The crossed polarizer 15 then passes a varying-amplitude portion of this radiation.

A modulation index of 100 percent (90° rotation of polarization) may be obtained with a magnetic field strength of about 1000 gauss, whereas the same index typically requires a field of ten kilogauss in indium antimonide (InSb) and in chromium tribromide, other materials hitherto thought promising for use in this fashion.

Although prior art demodulators or detectors may be employed to demodulate the modulation produced in the embodiments of FIGS. 1 and 2, tellurium and selenium have such large second order polarization coefficients that it is advantageous, for example, from the viewpoint of reducing detection noise, to employ single crystals of these materials as square-law type detectors for the modulated $10.6\mu$ radiation.

Figure 3:
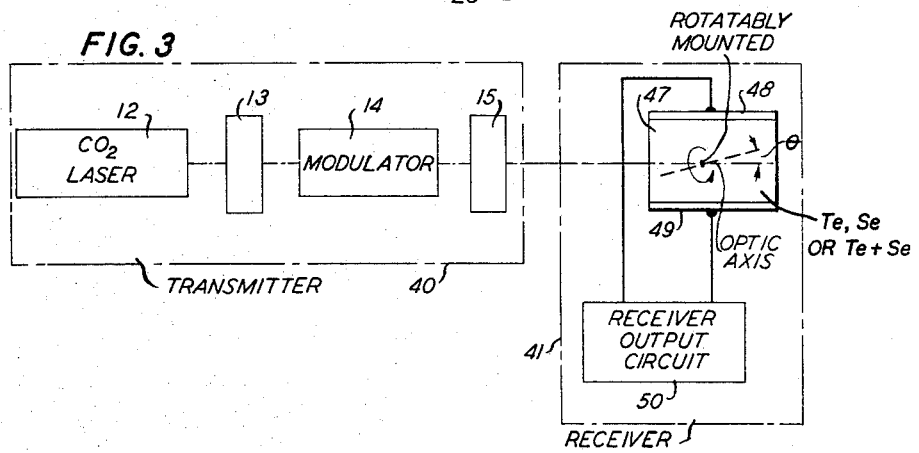
FIG. 3 is a partially pictorial and partially block diagrammatic showing of an embodiment of a detector according to another aspect of the present invention as employed in a communication system.

Such a detector is shown in FIG. 3, as employed in a receiver 41 separated from a transmitter 40 by a transmission medium such as the atmosphere. The transmitter 40 illustratively includes the devices 12, 13, 14 and 15, as described in connection with the embodiment of FIG. 1.

The receiver 41 includes the single crystal 47 of tellurium having its optic axis oriented at a very small angle $\theta$ with respect to the direction of propagation of radiation with its electrodes 48 and 49 lying in planes substantially parallel to the direction of propagation. The receiver output circuit 50 is also converted between electrodes 48 and 49.

For this application the tellurium crystal 47 is treated as previously discussed to have at the temperature of operation a hole concentration between $1 \times 10^{17}$ holes per cubic centimeter and $1 \times 10^{19}$ holes per cubic centimeter, and preferably about $10^{18}$ holes per cubic centimeter.

The small angle $\theta$ is used to make possible phase matching and optimally has a magnitude directly related to the modulation frequency, especially for modulation frequencies in the microwave range. Even for modulation frequencies in the high microwave range (wavelength longer than but approaching one millimeter) the angle $\theta$ preferably has a magnitude less than ten (10) degrees.

The electrodes 48 and 49 are illustratively vacuum-deposited gold and are both orthogonal to an $x$-axis of crystal 47, the electric field direction of the received radiation being parallel to a y-axis.

The receiver output circuit 50 illustratively comprises cascaded voltage amplifiers followed by one or more power amplifiers and a loudspeaker or other utilization device.

In operation, the second order polarization coefficient (nonlinear coefficient) $d_{11}$ of crystal 47, which I have measured to be $(1.27\pm0.2)\times10^{-5}$ ESU (electrostatic units), enables the detector to respond to the received amplitude-modulated radiation in the manner of a square-law detector. Since this effect is attributable to the non-linear characteristics of the polarization wave, i.e., non-resonant motion of charge dipoles, it is inherently a very broadband effect. The upper limit of its frequency response is primarily determined by and is inversely related to its time constant, which is the product of the capacitance between electrodes 48 and 49 and the effective resistance therebetween. Increasing the hole concentration in crystal 47 is one way of lowering this resistance and increasing the upper limit of the frequency response. In general, the time constant should be substantially less than one quarter of the shortest period of the amplitude modulation carried by the infrared radiation.

In particular, the nonlinear polarization wave typically has a component of motion which would be a fixed bias in the absence of modulation and which varies according to the modulation in the presence of modulation. Associated with this modulated component is a corresponding induced electromagnetic field at the modulation frequency. Since this field would tend to propagate along the optic axis crystal 47 at a velocity different from the velocity of $10.6\mu$ radiation, thereby producing destructive interference effects at electrodes 48 and 49, the provision of the angle $\theta$ permits phase-matching, as employed in the parametric oscillator and second harmonic generator of my above-cited concurrently filed application. A traveling wave interaction occurs which appears as a constructive interference effect at the modulation frequency at electrodes 48 and 49.

The conversion efficiency of the detector comprising crystal 47 and electrodes 48 and 49 is illustratively about $1\times10^{-5}$ volts per watt of 100 percent modulated input radiation if the crystal 47 has the preferred doping level. The conversion efficiency is essentially independent of the hole concentration as long as the $10.6\mu$ radiation is not lost due to absorption in the crystal.

Coupled with the foregoing conversion efficiency is a very low noise level, attributable to low intrinsic impedance of the detector with the net result that the signal-to-noise ratio is quite satisfactory for most infrared detection requirements.

As in the preceding embodiments of the invention, a selenium single crystal may be substituted for tellurium crystal 47 to provide an analogous effect extending to a wavelength of $0.8\mu$. Likewise, a mixed crystal of tellurium and selenium may be employed to obtain intermediate properties.

In all cases, the above-described arrangements are illustrative of the many possible specific embodiments that can represent applications of the principles of the invention. Numerous and varied other arrangements can be devised in accordance with these principles by those skilled in the art without departing from the spirit and scope of the invention.

What is claimed is:

1. Apparatus for use with infrared radiation comprising a single crystal consisting essentially of elemental material selected from the group consisting of elemental tellurium, elemental selenium and a mixture of elemental tellurium and elemental selenium, said crystal being adapted for irradiation with infrared radiation, means for irradiating said crystal with coherent infrared radiation, and means coupled to said crystal for signal translation with respect to said infrared radiation.

2. Apparatus according to claim 1 in which the signal translation means comprises a pair of electrodes attached to the crystal said crystal being adapted for transmission of infrared radiation in a direction making an angle less than ten degrees with respect to the optic axis of the crystal, whereby said apparatus may be employed as a square-law detector for amplitude-modulated infrared radiation.

3. Apparatus according to claim 2 in which the electrodes have a capacitance and the crystal has a resistance therebetween yielding a time constant substantially less than one-quarter of the shortest period of amplitude modulation carried by said infrared radiation.

4. An electro-optic modulator for infrared radiation, comprising a single crystal consisting essentially of elemental material selected from the group consisting of elemental tellurium, elemental selenium and a mixture of elemental tellurium and elemental selenium, said crystal having a hole concentration less than $1\times10^{17}$ holes per cubic centimeter, and means for applying a modulated electric field to said crystal.

5. A magneto-optic modulator for infrared radiation, comprising a single crystal consisting essentially of elemental material selected from the group consisting of elemental tellurium, elemental selenium and a mixture of elemental tellurium and elemental selenium, said crystal having a hole concentration between $1\times10^{18}$ and $1\times10^{19}$ holes per cubic centimeter, and means for applying a modulated magnetic field to said crystal.

6. A detector for amplitude-modulated infrared radiation, comprising a single crystal consisting essentially of elemental material selected from the group consisting of elemental tellurium, elemental selenium and a mixture of elemental tellurium and elemental selenium, said crystal having a hole concentration between $1\times10^{17}$ and $1\times10^{19}$ holes per cubic centimeter, and electrode means for extracting a signal responsive to the amplitude modulation, said crystal being oriented with its optic axis at an angle with respect to the received modulated infrared radiation to provide phase-matching of said modulated radiation and the field of the signal extracted by said electrode means.

References Cited

UNITED STATES PATENTS

| 3,121,203 | 2/1964 | Heywang | 250—199 XR |
| 3,200,259 | 8/1965 | Braunstein. | |
| 3,237,011 | 2/1966 | Sterzer | 250—199 |
| 3,317,847 | 5/1967 | White | 329—198 |

ROBERT L. GRIFFIN, *Primary Examiner.*

A. MAYER, *Assistant Examiner.*